(Model.)
N. TALARD.
Device for Securing Pipe Joints.
No. 242,714. Patented June 7, 1881.
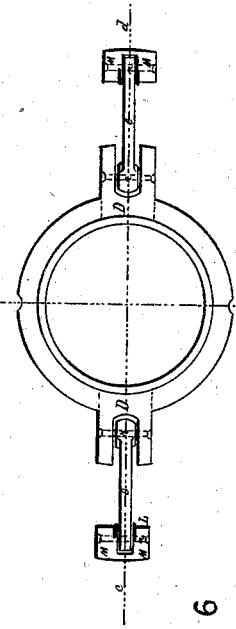
FIG. 3
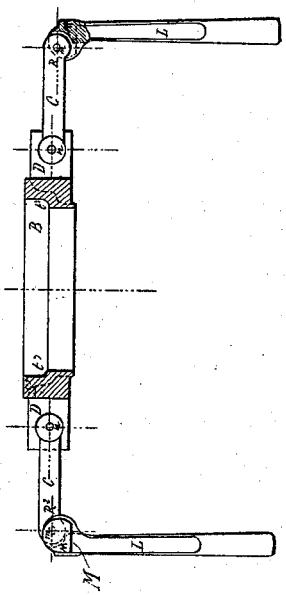
FIG. 4
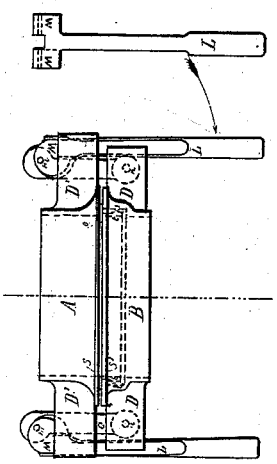
FIG. 5
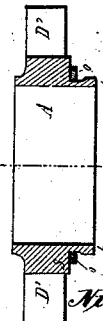
FIG. 6
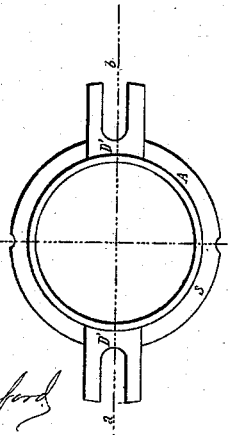
FIG. 1
FIG. 2
Witnesses
J. A. Rutherford
Robert Everitt
Inventor,
Nicolas Talard,
by James L. Norris.
Atty.

UNITED STATES PATENT OFFICE.

NICOLAS TALARD, OF PARIS, FRANCE.

DEVICE FOR SECURING PIPE-JOINTS.

SPECIFICATION forming part of Letters Patent No. 242,714, dated June 7, 1881.

Application filed February 23, 1881. (Model.) Patented in France December 23, 1876, and in England December 7, 1880.

*To all whom it may concern:*

Be it known that I, NICOLAS TALARD, a citizen of France, residing at Paris, in the Republic of France, have invented an Improved Device for Securing Pipe-Joints, (for which I have obtained a patent in Great Britain, No. 5,102, bearing date 7th December, 1880, and in France, bearing date the 23d December, 1876,) of which the following is a specification.

My invention has for its object to afford ready means for securing together the ends of pipes without the use of screw-bolts or screw-couplings, so that the joint may be rapidly and effectually connected and disconnected.

It consists, mainly, in bringing the flanges or socket and spigot of two lengths of pipe closely together by the eccentric action of a cam-lever connected by a link to the one length and caused to bear upon a projection or fork on the other length so as to draw the two together.

The accompanying drawings show the device as applied to flexible tubing or hose; but it may be equally well applied to metal pipes. Also, the drawings show a socket and spigot joint; but the invention is also equally applicable to joints with flush abutting surfaces.

Figure 1 shows a plan of the spigot or male half-joint. Fig. 2 shows a section on line *a b*, Fig. 1. Fig. 3 shows a plan of the socket or female half-joint. Fig. 4 shows a section on line *c d*. Fig. 5 shows the two half-joints secured together, and Fig. 6 shows a face view of one of the cam-levers.

The male half-joint A, which is secured in any known manner to the end of the tube or hose, has, first, a projection or spigot, *t*, which fits into the recess or socket *t'* of the female half-joint B, and, secondly, a caoutchouc ring, *o*, which butts against the meeting-surface of B when fitted together. Both half-joints have forked lugs D D D' D', those D of the female part having pivoted to them by pins *n* links C, to the other ends of which are pivoted levers L by means of pins *m*. These levers have on each side eccentric or cam-shaped projections M, so that when the joints are fitted together and the links C are placed in the forks D' of the joint A, with the levers extended in the contrary direction to that shown in the Fig. 5, the shortest radii of the cams will be presented to the surfaces of D'. If, now, the levers be turned into the position shown in Fig. 5, the cams M will draw the half-joints close together, compressing the caoutchouc ring *o* between them, so as to make a tight joint, and they will be securely held in the position shown by the flat faces M' of the cams being brought to bear upon the faces of D'. On again turning up the levers L and drawing the links C out of the forks the joint will be as rapidly disconnected.

Having thus described the nature of the said invention and in what manner the same is to be performed, I claim—

In a pipe-joint, the combination of the links C, pivoted to the one half-joint, with the levers L, having cams M, that are caused by turning the levers to bear upon the forks D of the other half-joint, so as to draw the two halves close together, substantially as herein described.

In testimony whereof I, the said NICOLAS TALARD, have hereunto signed my name, in the presence of three subscribing witnesses, this 3d day of February, A. D. 1881.

NICOLAS TALARD.

Witnesses:
JULES CHARLES EUGÉNE DUPONT,
JULES HENRI DIGEON,
PHILIP WALKER.